United States Patent
Zhang et al.

(10) Patent No.: US 8,195,112 B1
(45) Date of Patent: Jun. 5, 2012

(54) TIME-REVERSAL-BASED COMMUNICATION

(75) Inventors: Hongyuan Zhang, Sunnyvale, CA (US); Arul Durai Murugan Palanivelu, Sunnyvale, CA (US); Rohit U. Nabar, Sunnyvale, CA (US); Songping Wu, Cupertino, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 485 days.

(21) Appl. No.: 12/481,884

(22) Filed: Jun. 10, 2009

Related U.S. Application Data

(60) Provisional application No. 61/073,589, filed on Jun. 18, 2008.

(51) Int. Cl.
*H01Q 11/12* (2006.01)
*H04B 1/04* (2006.01)
(52) U.S. Cl. .................................. 455/127.2; 455/63.1
(58) Field of Classification Search .................... 455/39, 455/500, 504, 522, 63.1, 127.2; 375/259, 375/285
See application file for complete search history.

(56) References Cited

U.S. PATENT DOCUMENTS

| | | | | |
|---|---|---|---|---|
| 5,337,264 | A * | 8/1994 | Levien | 708/300 |
| 7,587,291 | B1 * | 9/2009 | Sarvazyan et al. | 702/103 |
| 2001/0037075 | A1 * | 11/2001 | Candy | 601/2 |
| 2003/0138053 | A1 * | 7/2003 | Candy et al. | 375/259 |
| 2006/0098746 | A1 * | 5/2006 | Candy et al. | 375/259 |
| 2006/0115031 | A1 * | 6/2006 | Lindskog et al. | 375/348 |

* cited by examiner

*Primary Examiner* — Nguyen Vo

(57) ABSTRACT

Time-reversal filtering may be used to temporally focus a signal to be transmitted. Power can be reduced at the transmitter so that the temporally focused signal is within spectral mask requirements. In one embodiment, the effect of the time-reversal filter on the power spectral density for a particular transmitted signal can be calculated and the predicted power spectral density can be compared to the permitted spectral mask to identify violations, if any, of the spectral mask. The transmitter power can then be reduced by the amount of the violation. In another embodiment, a set of different time-reversal filters that meet the spectral mask requirements can be provided in advance, and the most appropriate filter—e.g., the one with the best signal-to-noise ratio for the particular signal—can be chosen from the set of filters.

8 Claims, 6 Drawing Sheets

TIME-REVERSAL-BASED COMMUNICATION

CROSS REFERENCE TO RELATED APPLICATION

This claims the benefit of copending, commonly-assigned U.S. Provisional Patent Application No. 61/073,589, filed Jun. 18, 2008, which is hereby incorporated by reference herein in its entirety.

BACKGROUND

This relates to a method and apparatus for communication using time-reversal techniques, and particularly to the use of such techniques in systems having multiple transmitters and/or receivers.

In communications systems having multiple transmitters and/or receivers, such as Multiple-Input/Multiple-Output ("MIMO") systems, the power of a signal that reaches a particular intended receiver will have been attenuated as the signal propagates throughout the system. This may give rise to other performance issues such as increased inter-symbol interference ("ISI").

Use of time-reversal communications techniques, originally developed in acoustic systems, but applicable also to electromagnetic (e.g., radio-frequency) communications, may address some of these issues, but may also affect the power spectral density ("PSD") in a way that may give rise to spectral mask violations.

SUMMARY

In accordance with one embodiment, apparatus to transmit a signal, with a power spectral density within a predetermined spectral mask, includes a transmitter to generate the signal, a time-reversal filter to temporally focus the signal, and a power control module to maintain the power spectral density of the temporally focused signal within the predetermined spectral mask.

In accordance with another embodiment, a method to transmit a signal, with a power spectral density within a predetermined spectral mask, includes generating a signal using a transmitter, applying a time-reversal filter to temporally focus the signal, and maintaining the power spectral density of the temporally focused signal within the spectral mask.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
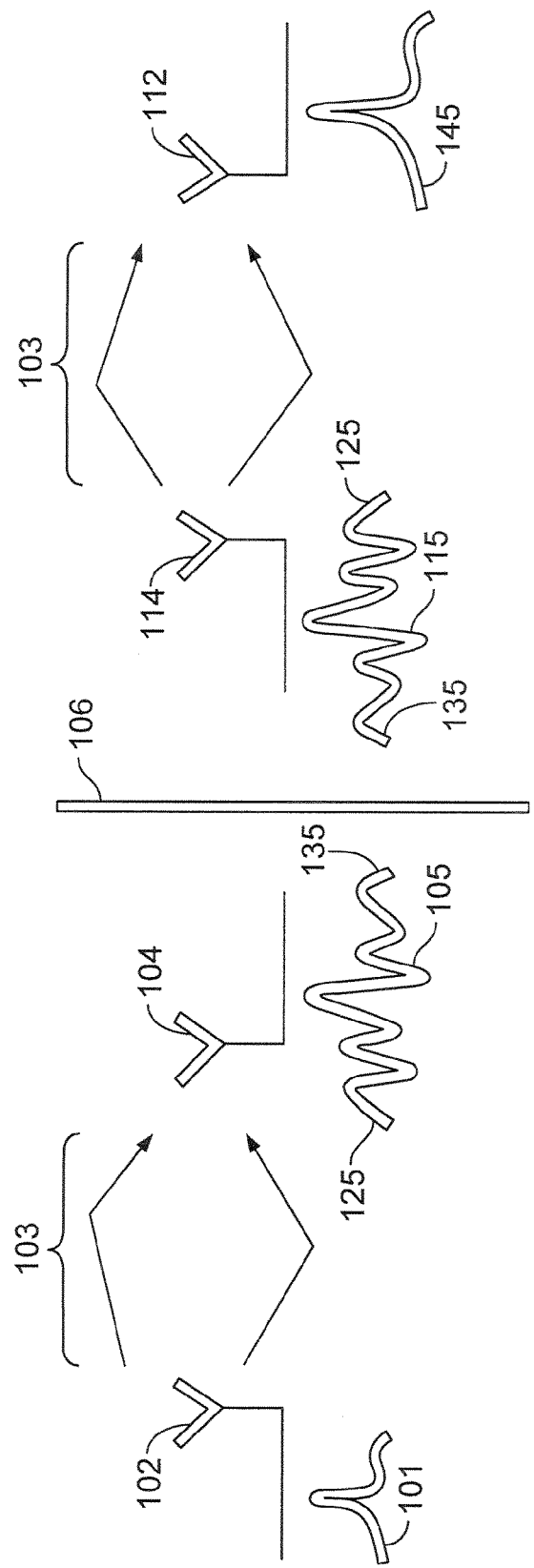
FIG. 1 is a representation of an example of time-reversal signal processing.

Time-reversal-based communication exploits multi-path reflections to improve temporal focusing at an intended receiver. The technique is therefore useful in a multi-path system such as a MIMO system or any system with a phased-array antenna at the transmitter and/or receiver, which increase the temporal focusing effect. The benefits of temporal focusing increase as the number of temporal components in a signal increases. Thus, the greater the bandwidth, the more temporal focusing is likely to be helpful. For example, in a 60 GHz communication channel, the bandwidth may be a relatively large 2 GHz, resulting in a spectrum that typically is temporally rich. Accordingly, time-reversal techniques would be useful in such a channel.

One result of temporal focusing is that the signal may be amplified. Although that generally is a desirable and intended result, one side effect may be that the power spectral density of the transmitted signal may be altered such that the spectral mask requirements are violated, meaning that the amount of power being transmitted at a particular frequency may exceed the maximum amount of power allowed by the spectral mask requirements at that frequency.

In accordance with embodiments of the invention, power can be reduced at the transmitter so that the transmitted signal is within the spectral mask requirements.

In accordance with one embodiment, the channel transfer characteristics can be determined and used to calculate the effect of the time-reversal filter on the power spectral density for a particular transmitted signal. The predicted power spectral density can be compared to the permitted spectral mask to identify violations, if any, of the spectral mask, and frequencies at which the spectral mask is violated can be noted. The frequency at which the spectral mask violation is greatest, and the amount by which the mask is violated at that frequency, can be identified. The transmitter power can then be reduced by the amount of the violation.

In accordance with another embodiment, a set of different time-reversal filters can be provided in advance. Based on the channel characteristics, which can be measured, and the spectral mask requirements, the most appropriate filter can be chosen from the set of filters. In one variant of this embodiment, the filters in the set can be designed so that there will always be at least one available filter that will meet the spectral mask requirements without violation.

Time-reversal filters operate best where there is good channel reciprocity, meaning that the amplitude change (gain) and phase change in one direction across the channel are as similar as possible to the gain and phase change in the other direction. This is less important for a channel with a single transmit antenna and single receive antenna, because in such a channel the gain/phase imbalance between the transmit and receive directions is of little consequence to the time-reversal filter. However, where there are multiple radiating elements (such as in a MIMO system or other system having a phased array of transmit and/or receive antennas), a gain/phase imbalance between the transmit and receive directions would be of more consequence to the time-reversal filter. Therefore, in such systems, some form of calibration may be used to maintain reciprocity. Ideally, the transmit/receive responses corresponding to each radiating element would be identical, but this condition can be relaxed, as long as the transmit/receive gains are similar and the phase differences between transmit/receive paths are substantially the same across all elements.

The basic concept of time-reversal signal processing is illustrated in FIG. 1. As seen there, if a waveform 101 is transmitted by transmitter 102 across a multi-path channel 103 and received at receiver 104, the received waveform may have the appearance shown at 105. Waveform 105 may be processed by a time-reversal filter, commonly referred to as a time-reversal mirror and depicted in FIG. 1 by line 106, and retransmitted back through channel 103 in the opposite direction using receiver 104 as a transmitter 114 to a receiver 112 at the location of transmitter 102.

The operation of time-reversal mirror 106, considered in its most basic form, is to transmit first the last-received sample 125 of waveform 105, working backwards through waveform 105 so that the first-received sample 135 is the last to be transmitted. The result is mirrored waveform 115, transmitted by transmitter 114. As depicted graphically, when mirrored waveform 115 is transmitted back through channel 103 by transmitter 114, the temporally-focused waveform 145 received at receiver 112 is an amplified version of original waveform 101.

Figure 2:
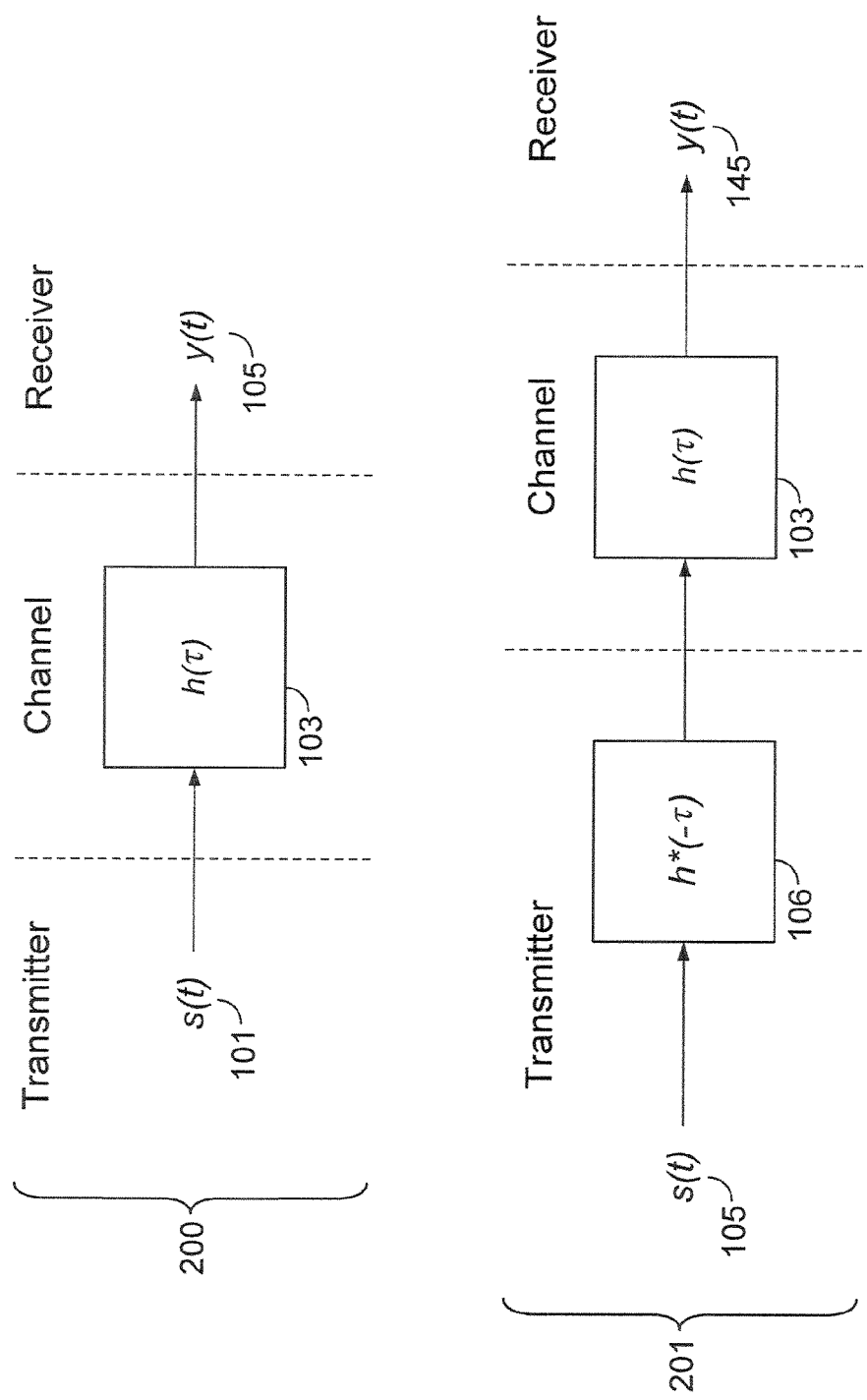
FIG. 2 is a mathematical representation of the time-reversal signal processing show in FIG. 1.

Mathematically, the process may be depicted as in FIG. 2. In upper path 200, which represents the original transmission, original waveform 101 is depicted as a function s(t), while received waveform 105 is depicted as a function y(t). Transmission channel 103 is depicted as an impulse response h(τ), where τ represents a delay variable. h(τ) can be derived by sending an impulse through channel 103 and analyzing the received signal.

The mirrored transmission is represented by lower path 201. Here, the transmitted signal s(t) is waveform 105, and the received signal y(t) is waveform 145. Channel 103 is again represented by impulse response h(τ), while time-reversal mirror 106 is represented by the conjugate and reversed impulse response h*(−τ). Time-reversal mirror 106 is thus easily derivable mathematically once channel 103 has been characterized.

One effect of temporal focusing is a higher signal-to-noise ratio at the intended receiver. This may derive, at least in part, from a coherent combining effect of multi-path reflections at a particular delay instant, and may result in improved synchronization, data decoding performance, etc.

Figure 3:
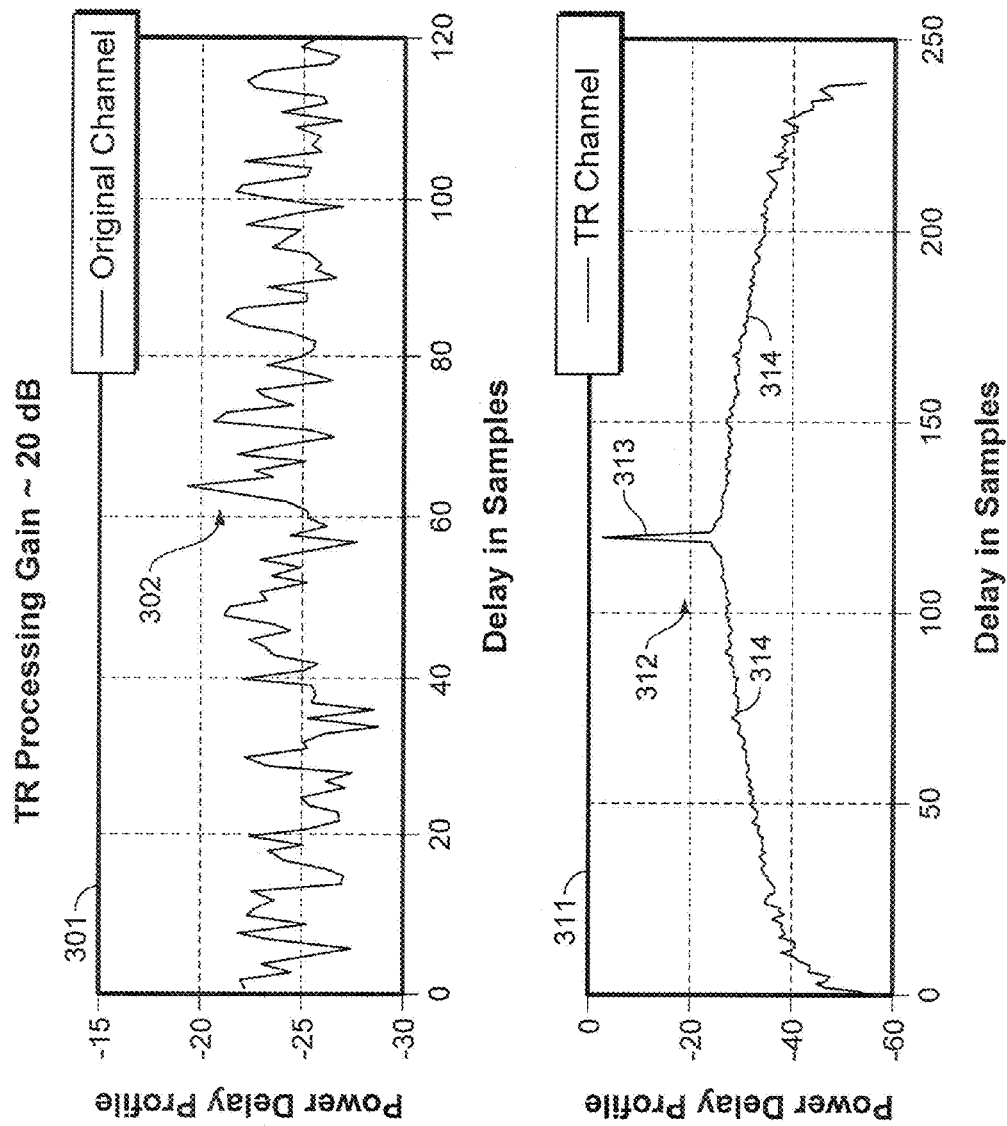
FIG. 3 shows the effect of time-reversal signal processing on inter-symbol interference.

Another effect of temporal focusing is reduction in channel ISI. This may occur as the higher main-lobe to side-lobe ratio of the effective channel reduces required equalization complexity for channels with a large delay spread. This effect may be of particular consequence in single-carrier modulation. The effect is illustrated in FIG. 3, where ISI in original channel 301 is so great that there is no discernable main lobe in signal 302, while in time-reversed channel 311, there is a pronounced main lobe 313 in signal 312, as well as very weak side lobes 314.

One other effect of temporal focusing in a system with multiple receivers is that signal energy at receivers other than the intended receiver may be reduced. This conserves power by focusing energy where the signal is meant to be sent. In CTAP, or time-slot-based, communication, this may not matter. However, in CAP, or contention-based, communication, this may be disadvantageous, because contention systems depend on the ability of all receivers to determine if the channel is in use. Therefore, time-reversal-based communication may not be appropriate for contention-based systems.

It will be appreciated that achieving useful time-reversal filtering when reflecting a signal back through a transmission channel relies on a high degree of channel reciprocity—i.e., the channel characteristics should be substantially the same in both directions. However, time-reversal filtering in a system having a single transmit antenna and a single receive antenna at each end of a channel will not be greatly affected by gain imbalance or phase imbalance between the two directions of the channel.

Nevertheless, the benefit of time-reversal transmission is not so much in being able to return a signal to its source in amplified form as to deliver it to another receiver in amplified form. That is, receiver 112 may not be co-located with transmitter 102. Indeed, according to embodiments of the invention, time-reversal filtering can be used to temporally focus a signal sent by transmitter 102 to a receiver at another location by characterizing the channel between transmitter 102 and that receiver and using the channel characterization to derive a time-reversal filter to temporally focus the signal without actually transmitting it back and forth. It will be appreciated, however, that reflecting a signal through a different channel than the one on which it was originally transmitted—whether actually or calculationally by applying a filter—will have a time-reversal effect on that signal only if the channel characteristics of that different channel are substantially the same as those of the original channel.

The requirements are even stricter when an antenna has multiple radiating elements (as in a phased-array antenna) where differences in the transmit/receive responses of different elements may affect the time-reversal process, although the system will function sufficiently well as long as the different responses are substantially similar, even if they are not absolutely identical.

Therefore, systems according to embodiments of the invention rely on gain and phase reciprocity as follows:

$$G_i^F \sim G_j^R \ \forall i,j$$

$$\theta_i^F - \theta_i^R \sim \theta_j^F - \theta_j^R \ \forall i,j$$

meaning that forward and reverse gain over all channels i,j should be substantially the same, and that the phase difference between the forward and reverse direction in one channel should be substantially the same as the phase difference between the forward and reverse direction in any other channel over all channels i,j. Accordingly, a system according to one implementation may include channel calibration to assure that within each channel there is not a significant variance of gain or phase delay between the forward and reverse paths, and that there is not a significant variance of gain or phase delay from one channel in the system to the next.

Another effect of time-reversal filtering, which may be evident from the differences between waveform 101 and waveform 105, is that time-reversal filtering may alter the power spectral density of the transmitted signal. Therefore, in cases where a particular power spectrum requirement (spectral mask) is imposed, whether by an industry standard, by regulatory authorities, or otherwise, care must be taken to make sure that the spectral mask requirement is not violated by the transmitted waveform after time reversal.

Figure 4:
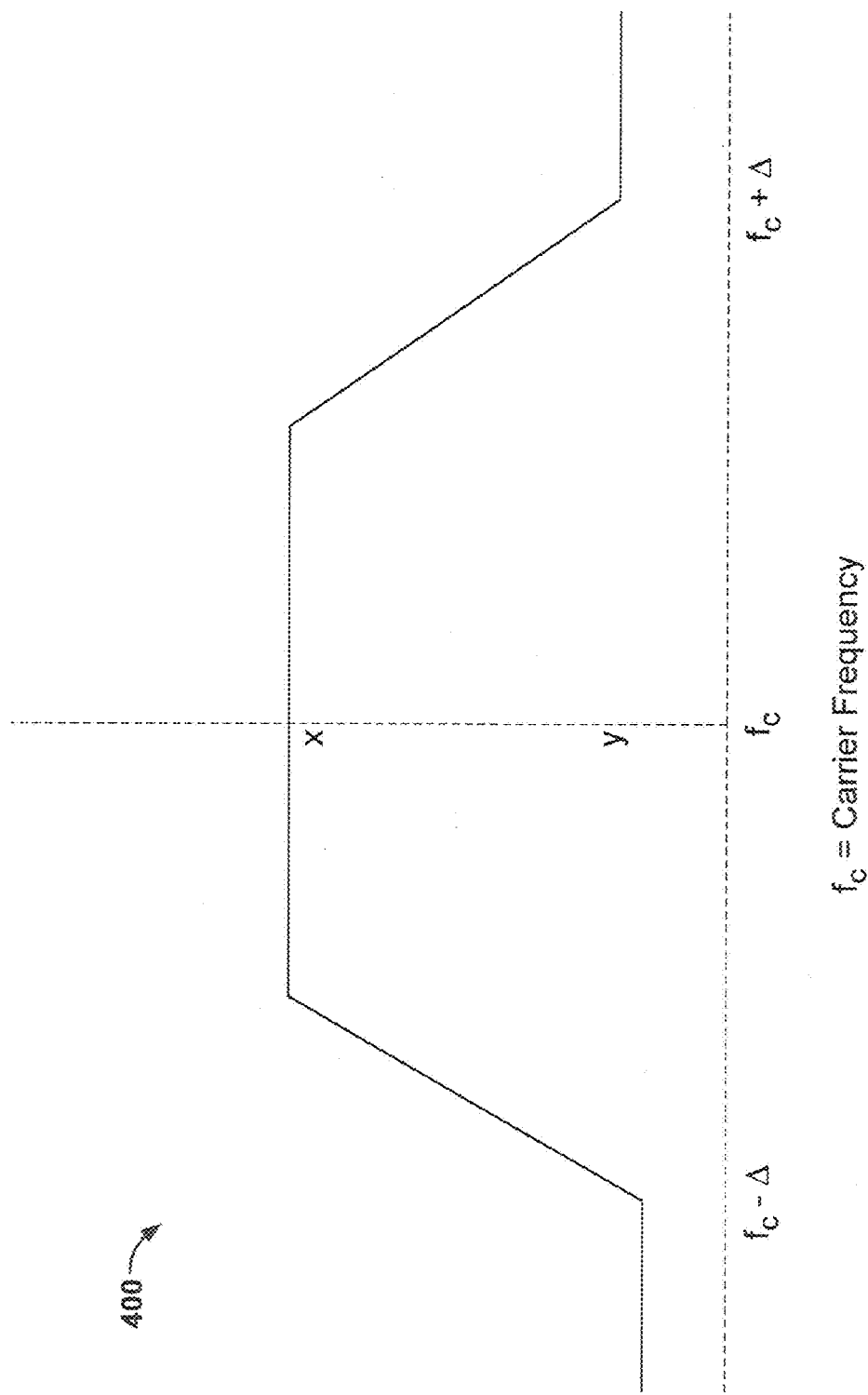
FIG. 4 shows an example of a spectral mask.
Figure 5:
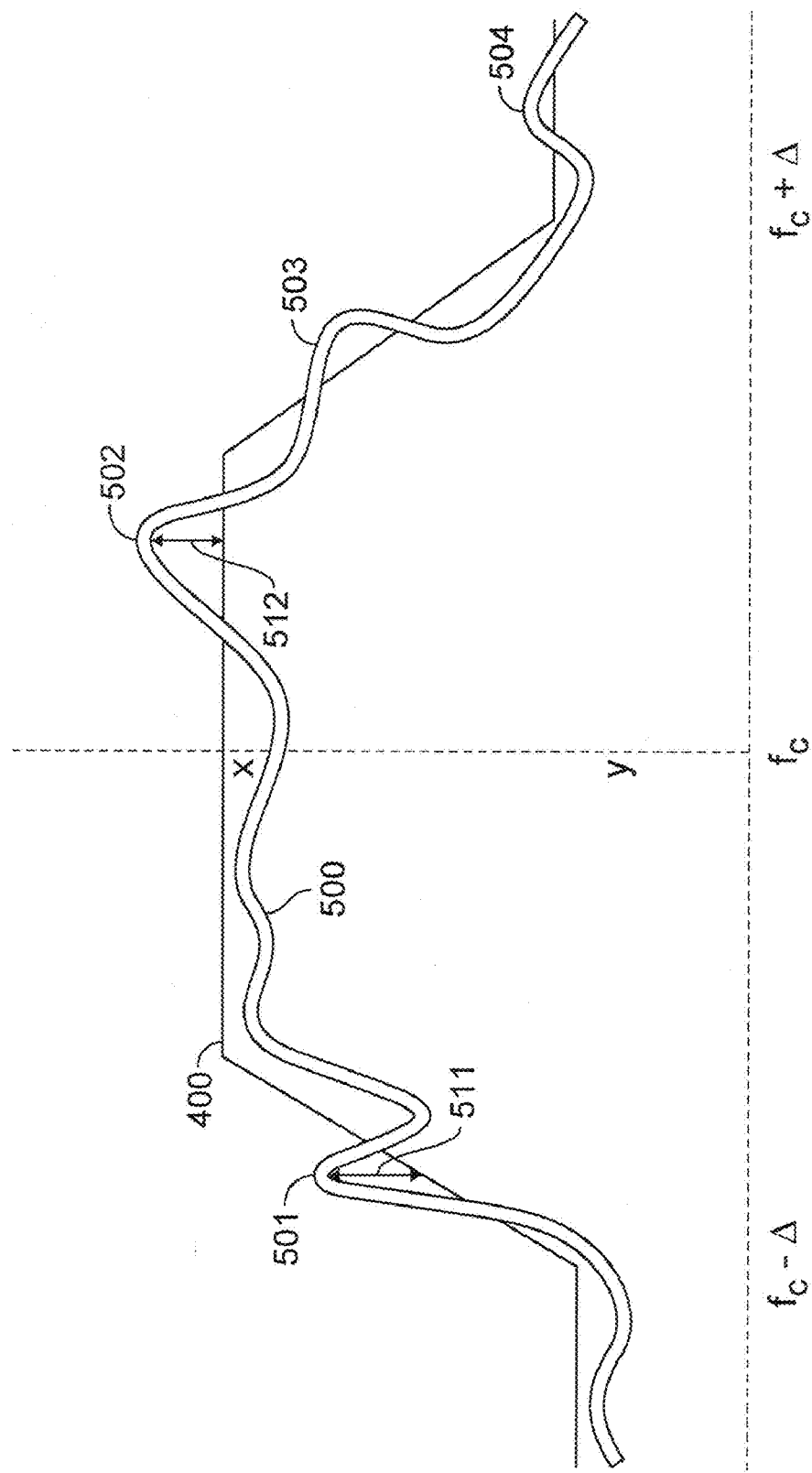
FIG. 5 shows a comparison of a time-reversed signal to the spectral mask of FIG. 4.

For example, a simple spectral mask 400 such as that shown in FIG. 4 may be imposed. In spectral mask 400, the allowable power level may be x at the carrier frequency $f_c$ and at frequencies between $f_c - 0.6\Delta$ and $f_c + 0.6\Delta$, falling linearly to power level y at $f_c - \Delta$ and below and $f_c + \Delta$ and above. As seen in FIG. 5, a transmitted waveform may have a power spectrum 500 after time-reversal filtering which exceeds the limits of spectral mask 400 at, e.g., points 501, 502, 503 and 504.

According to one embodiment, the power spectrum 500 may be kept within the spectral mask requirements by reducing power at the transmitter. The amount by which the transmitter power should be reduced can be determined by examining the points 501-504 at which spectrum 500 exceeds the power allowed by spectral mask 400, identifying which of points 501-504 represents the greatest violation, and reducing the transmitter power accordingly. Note that the point of greatest violation may not be the point of maximum power. For example, while point 502 is the point of maximum power in spectrum 500, and exceeds the allowable power level of mask 400 by amount 512, point 501 represents a greater violation whether the violation is measured as an absolute power level difference 511, or as a percentage of the allowed power level. In this particular example, the allowed power level at point 501 is about 74% of the actual power level at point 501. Therefore, in accordance with this embodiment, transmitter power would be reduced to about 74% of its original value. This will lower the power level at all frequencies, and will insure that there is no spectral mask violation at any frequency, including those at which the original power level did not cause any spectral mask violation. It should be recognized, however, that the particular spectral mask 400 and power spectrum 500 are only examples, and the actual spectral mask and power spectrum, and therefore the amount of transmitter power reduction, will differ from one implementation to the next.

Spectral mask violations could be detected and corrected by a feedback-type system in which the signal to be transmitted is passed through the time-reversal filter and the filtered signal is monitored, with violation information being relayed back to the transmitter so that power at the transmitter can be reduced. However, such an implementation involves allowing violations to occur, if only for a short time. One alternative is to calculate the effect of a time-reversal filter on a waveform to be transmitted and then determine from that calculated result what the transmitter power level should be to avoid any spectral mask violation.

The power spectrum of the transmitted signal before application of the time-reversal filter is known at the transmitter and may be designated S(f). For application of a time-reversal filter to a given channel characterized by H(f), the composite power spectrum of the filtered signal may be estimated as $S(f)|H(f)|^2$, where $$H(f) = \int_{-\infty}^{\infty} h(\tau) e^{-j2\pi f \tau} d\tau$$

The calculated composite power spectrum may be compared to the allowed spectral mask and the transmitter power can be adjusted to avoid violation.

According to another embodiment, a number N of time-reversal filters $g_i(\tau)$, $i=1, 2, \ldots, N$, can be precalculated and stored. The various filters $g_i(\tau)$ should be chosen so that for any waveform to be transmitted, at least one filter will meet the spectral mask requirements. Generally, because the spectral mask is a statistical quantity based on the average transmitted power at a given frequency, and the average is calculated across transmitted waveforms, it should be possible to choose filters $g_i(\tau)$ so that all filters will meet the spectral mask requirements for any waveform to be transmitted. For a given channel characterized by impulse response $h(\tau)$, the ith filter can be chosen (given that all filters meet the spectral mask requirement) to maximize the signal-to-noise ratio, as follows:

$$i^* = \mathrm{argmax}_i \int_{-\infty}^{\infty} \left| \int_{-\infty}^{\infty} g_i(x) h(\tau - x) dx \right|^2 d\tau$$

Figure 6:
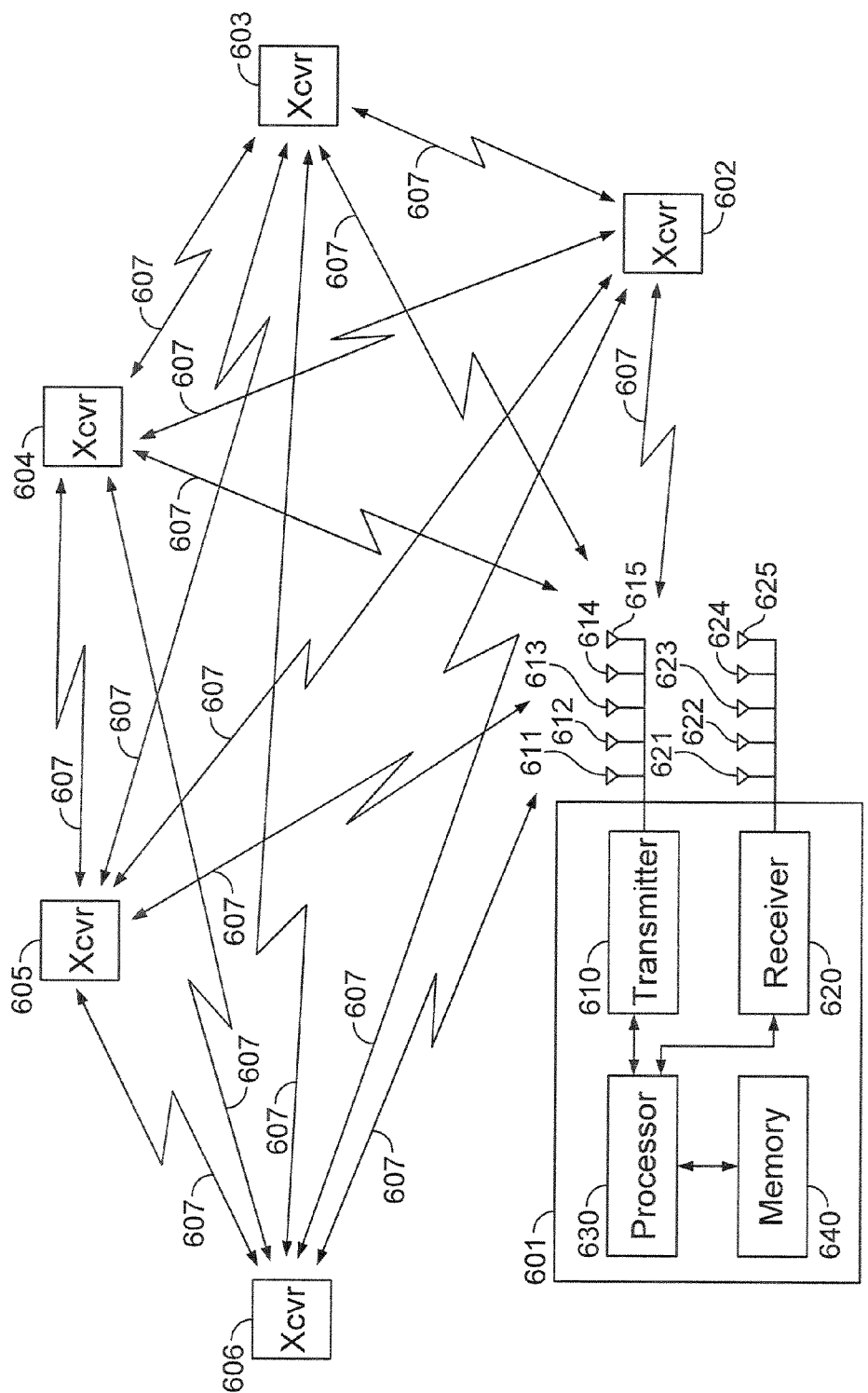
FIG. 6 is a schematic diagram of an exemplary system for implementing an embodiment of the invention.

A exemplary Multi-User MIMO system 600 in which embodiments of the invention may be implemented is shown schematically in FIG. 6. System 600 includes a plurality of transceivers 601-606 of which one transceiver 601 is shown in detail. Some of transceivers 601-606 may have multiple antennas (e.g., a phased-array antenna) for one or both of transmission and reception, while others may have a single antenna.

As shown, transceiver 601 includes a transmitter 610 having antennas 611-615, and a receiver 620 having antennas 621-625. Transceiver 601 also includes a processor 630 for controlling transmitter 610 and receiver 620, as well as memory 640 linked to processor 630.

Each transceiver 601-606 can communicate with each other one of transceivers 601-606. This is indicated in FIG. 6 by links 607. Each of links 607 may represent multiple links when one or both of the transceivers on a link has multiple antennas.

In such a system 600, if transceiver 601 wants to send a message to transceiver 604, the message will be radiated to all transceivers 602-606. But if transceiver 601 processes the signal through a time-reversal filter based on the channel 607 between transceiver 601 and transceiver 604, the signal will become temporally focused at transceiver 604. As stated above, a high degree of reciprocity between both directions of the channel between transceiver 601 and transceiver 604 is required for this to work.

Transceiver 601 may not want to communicate only with transceiver 604. Each of transceivers 601-606 may want to communicate with each other one of transceivers 601-606. Therefore, as discussed above, it is desirable that there not only be reciprocity between both directions of each channel between transceiver 601 and transceiver 604, but also across all channels on all links 607. Processor 630 may control transmitter 610 and receiver 620 to carry out the aforementioned channel calibration to assure reciprocity. For example, processor 630 may direct transmitter 610 to send an unfiltered transmission to another one of transceivers 601-606 with a request that that other transceiver return the transmission. When the returned transmission is received by receiver 620, processor 630 may compare the returned transmission to the original transmission to determine the channel characteristics. Alternatively, processor 630 may direct transmitter 610 to send a request to another one of transceivers 601-606 to send a return transmission of a known symbol or symbols. When the returned transmission is received by receiver 620, processor 630 may compare the returned transmission to the known symbol or symbols to determine the channel characteristics.

In addition, processor 630 may control the time-reversal process by storing a waveform generated by transmitter 610 into memory 640, and reading it out in reverse order, according to a time-reversal filter also stored in memory 640.

Processor 630 may also control transmitter power as described above to prevent spectral mask violations. In that connection, processor 630 may calculate the effect of a time-reversal filter on a signal to be transmitted and then compare the result to the spectral mask, which may be stored in memory 640. If there would be a violation based on that comparison, processor 630 could determine how much the transmitter power would have to be reduced and then adjust transmitter 610 accordingly.

In the embodiment described above in which a selection is made among several candidate time-reversal filters all of which meet the spectral mask requirement, that selection may be made by processor 630. Specifically, the various time-reversal filters may stored in memory 640 and processor 630 could carry out the aforementioned evaluation of the signal to be transmitted relative to the various candidate filters to determine which has the highest signal-to-noise ratio. It could then control the application of that selected filter to the signal to be reflected, which had previously been stored in memory 640. In a variant where not all candidate filters necessarily meet the spectral mask requirements, processor 630 may calculate the effect of the selected time-reversal filter on a signal to be transmitted and then compare the result to the spectral mask, which may be stored in memory 640. If there would be a violation based on that comparison, processor 630 could then select the filter with the next-highest signal-to-noise ratio and compare the result of using that filter to the spectral mask, and so on until a filter that meets the spectral mask requirements is found.

Thus it is seen that a time-reversal-based communication system that improves temporal focusing at an intended receiver, without violating spectral mask limitations, has been provided. It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. Apparatus to transmit a signal with a power spectral density within a predetermined spectral mask, the apparatus comprising:
   a transmitter to generate the signal;
   a time-reversal filter to temporally focus the signal;
   memory to store characteristics of the time-reversal filter; and
   a power control module to maintain the power spectral density of the temporally focused signal within the predetermined spectral mask by calculating effect of the time-reversal filter on the signal to determine what the power spectral density of the signal will be after application of the time-reversal filter, and adjusting the transmitter before transmission to maintain the power spectral density within the spectral mask.

2. The time-reversal based apparatus of claim 1 wherein:
   the processor adjusts the transmitter by comparing the power spectral density to the spectral mask, and adjusting output power of the transmitter to maintain the power spectral density within the spectral mask.

3. The time-reversal based apparatus of claim 1 wherein:
   the characteristics of the time-reversal filter stored in the memory comprise characteristics of a plurality of candidate time-reversal filters;
   the processor adjusts the transmitter, to maintain the power spectral density within the spectral mask, by selecting, as the time-reversal filter, one of the plurality of candidate time-reversal filters stored in the memory.

4. The time-reversal based apparatus of claim 3 wherein the processor selects the one of the plurality of candidate time-reversal filters that maximizes signal-to-noise ratio in the temporally focused signal.

5. A method to transmit a signal with a power spectral density within a predetermined spectral mask, the method comprising:
   generating a signal using a transmitter;
   applying a time-reversal filter to temporally focus the signal; and
   maintaining the power spectral density of the temporally focused signal within the spectral mask by:
   calculating effect of the time-reversal filter on the signal to determine what the power spectral density of the signal will be after application of the time-reversal filter, and
   making an adjustment before transmission to maintain the power spectral density within the spectral mask.

6. The method of claim 5 wherein the making an adjustment comprises:
   comparing the power spectral density to the spectral mask; and
   adjusting output power of the transmitter to maintain the power spectral density within the spectral mask.

7. The method of claim 5 wherein the making an adjustment comprises selecting, as the time-reversal filter, one of a plurality of stored candidate time-reversal filters.

8. The method of claim 7 wherein the selecting comprises selecting one of the plurality of candidate time-reversal filters that maximizes signal-to-noise ratio in the temporally focused signal.

* * * * *